United States Patent
Suriano

[11] Patent Number: 5,852,352
[45] Date of Patent: Dec. 22, 1998

[54] REDUCED SPEED GROWTH IN WINDSHIELD WIPER MOTOR

[75] Inventor: John Riden Suriano, Kettering, Ohio

[73] Assignee: ITT Automotive Electrical Systems, Inc., Auburn Hills, Mich.

[21] Appl. No.: 833,981

[22] Filed: Apr. 11, 1997

Related U.S. Application Data

[63] Continuation of Ser. No. 475,771, Jun. 7, 1995, abandoned.

[51] Int. Cl.$^6$ .......................... H01R 39/18; H02K 13/00
[52] U.S. Cl. .......................... 318/541; 310/248; 310/242; 318/245
[58] Field of Search .................................. 318/244, 245, 318/246, 541, 443, 444, DIG. 2; 310/239, 242, 245, 248, 229, 233

[56] References Cited

U.S. PATENT DOCUMENTS

| | | | |
|---|---|---|---|
| 2,698,910 | 1/1955 | Blyth | 310/51 |
| 2,827,582 | 3/1958 | Krebs | 310/168 |
| 3,590,298 | 6/1971 | Hudak | 310/246 |
| 3,590,299 | 6/1971 | Tadworth et al. | 310/246 |
| 3,628,075 | 12/1971 | Dafler et al. | 310/239 |
| 4,013,829 | 3/1977 | Baar et al. | 358/299 |
| 4,320,329 | 3/1982 | Gille et al. | 318/443 |
| 4,473,920 | 10/1984 | Itani | 15/250.22 |
| 4,527,105 | 7/1985 | Shiraishi | 318/444 |
| 4,544,870 | 10/1985 | Kearns et al. | 318/444 |
| 4,625,157 | 11/1986 | Phillimore | 318/443 |
| 4,634,944 | 1/1987 | Hastings et al. | 318/443 |
| 4,663,575 | 5/1987 | Juzswik et al. | 318/444 |
| 4,672,253 | 6/1987 | Tajima et al. | 310/269 |
| 4,689,535 | 8/1987 | Tsunoda et al. | 318/443 |
| 4,692,645 | 9/1987 | Gotou | 310/184 |
| 4,761,576 | 8/1988 | Savage | 310/51 |
| 4,774,424 | 9/1988 | Habermann | 310/90.5 |
| 4,874,975 | 10/1989 | Hertrich | 310/186 |
| 4,890,024 | 12/1989 | Hashimoto et al. | 310/49 R |
| 4,933,584 | 6/1990 | Harms et al. | 310/162 |
| 4,947,066 | 8/1990 | Ghibu et al. | 310/49 R |
| 4,947,092 | 8/1990 | Nabha et al. | 318/444 |
| 4,983,873 | 1/1991 | Tanaka et al. | 310/248 |
| 5,030,899 | 7/1991 | Nashibe et al. | 318/444 |
| 5,086,245 | 2/1992 | Sieja et al. | 310/216 |
| 5,173,651 | 12/1992 | Buckley et al. | 318/701 |
| 5,296,774 | 3/1994 | Nishiwaki | 310/248 |
| 5,306,992 | 4/1994 | Droge | 318/483 |
| 5,331,257 | 7/1994 | Materne et al. | 318/85 |
| 5,485,049 | 1/1996 | Shannon et al. | 310/248 |

FOREIGN PATENT DOCUMENTS 2366735  4/1978  France .
581451  7/1933  Germany .

*Primary Examiner*—Bentsu Ro
*Attorney, Agent, or Firm*—J. Gordon Lewis

[57] ABSTRACT

In an ordinary DC motor in a windshield wiper, operating speed tends to increase as the motor brushes become seated. The invention counteracts this tendency by providing a brush geometry which causes the effective angular position of a brush to change during seating. The change is in a direction which tends to reduce speed.

8 Claims, 14 Drawing Sheets

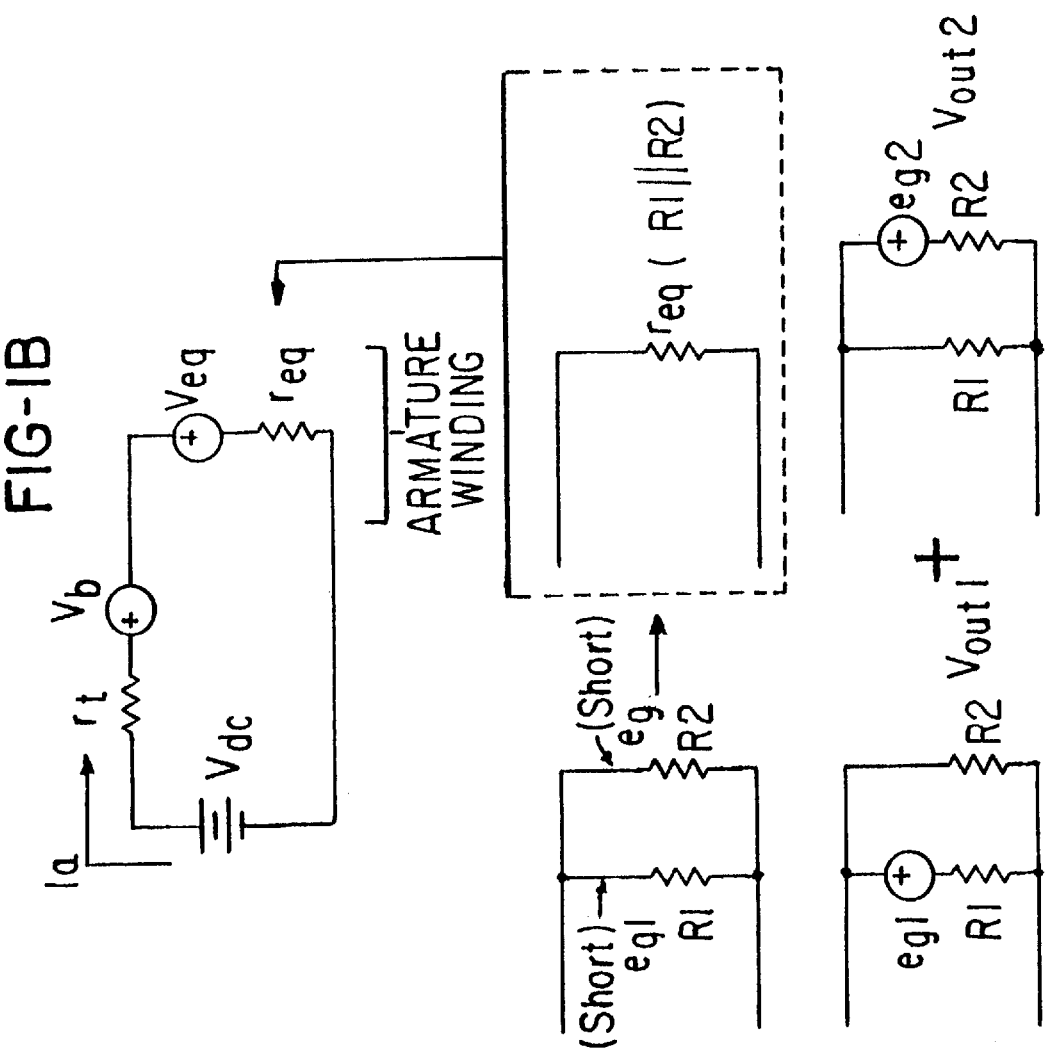
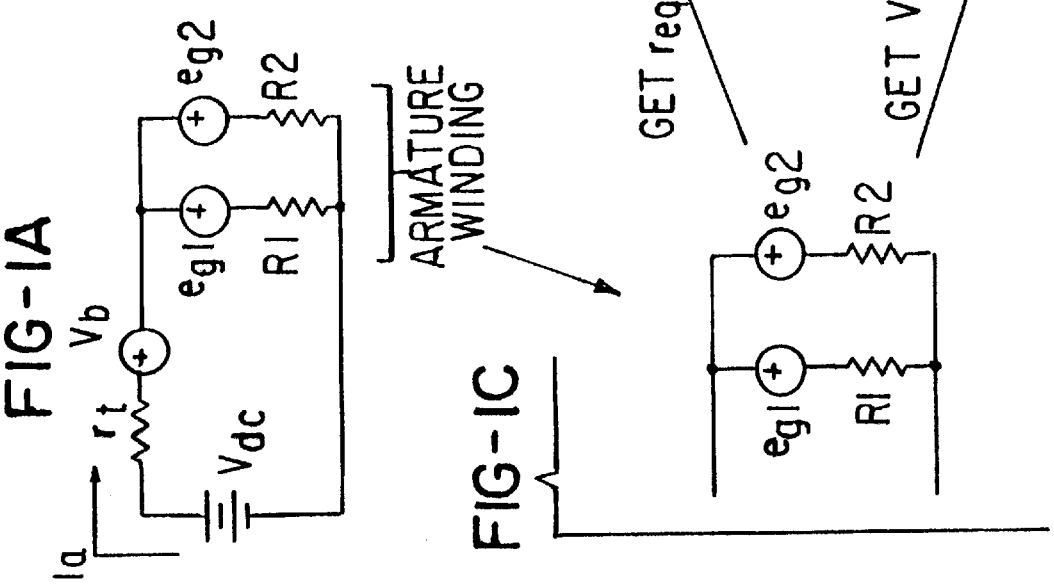
FIG-1A
FIG-1B
FIG-1C

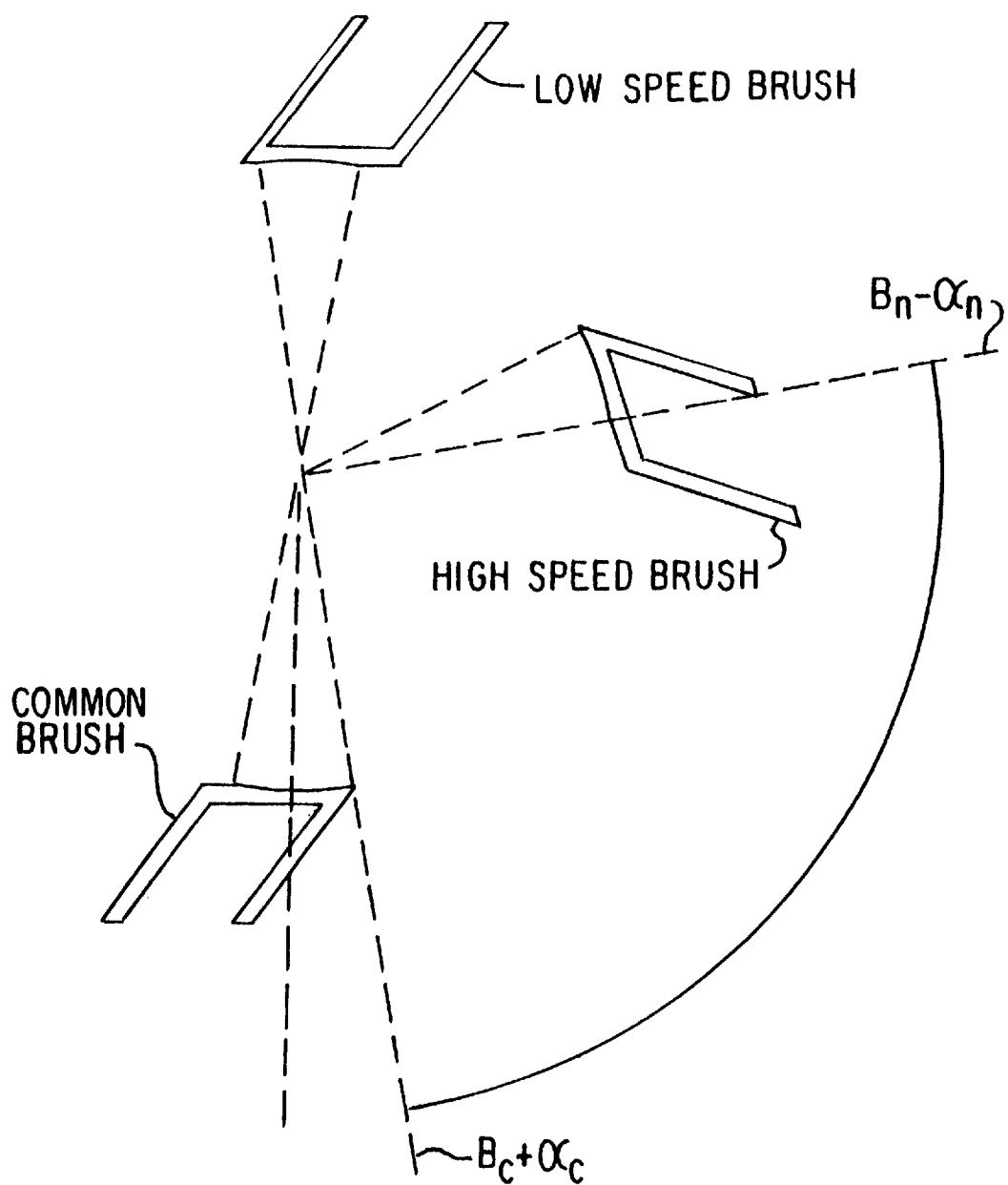

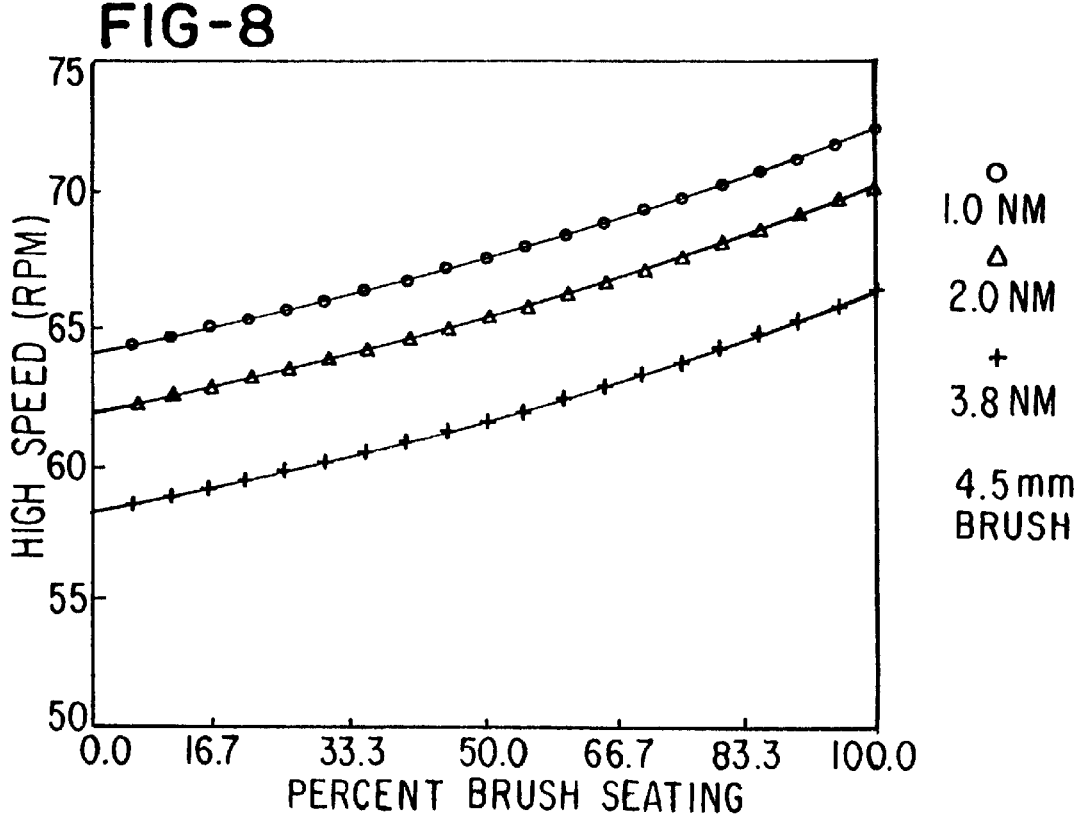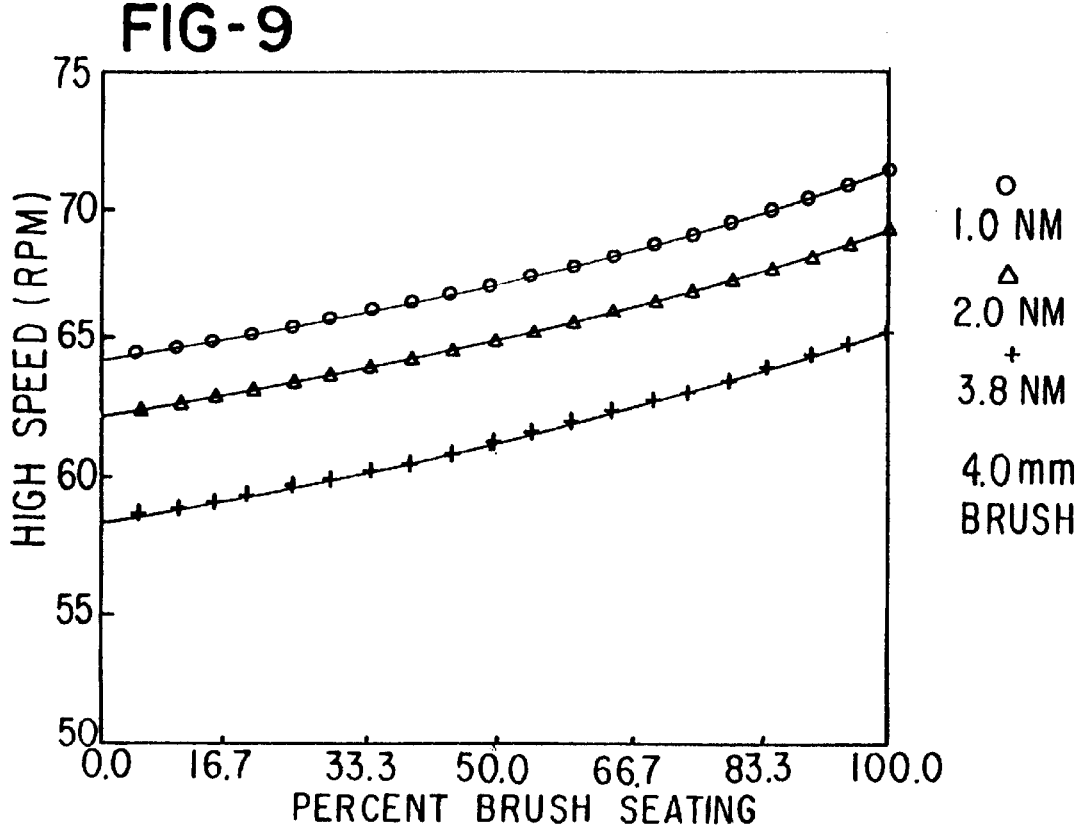

FIG-10
| | 4.5mm High Speed Brush Width | | 4.0mm High Speed Brush Width | |
|---|---|---|---|---|
| Load Torque (NM) | Initial Speed (RPM) | Run-In Speed (RPM) | Initial Speed (RPM) | Run-In Speed (RPM) |
| 1.0 | 64.1 | 72.2 | 64.1 | 71.4 |
| 2.0 | 62.0 | 70.0 | 62.0 | 69.1 |
| 3.8 | 58.3 | 65.9 | 58.3 | 65.2 |
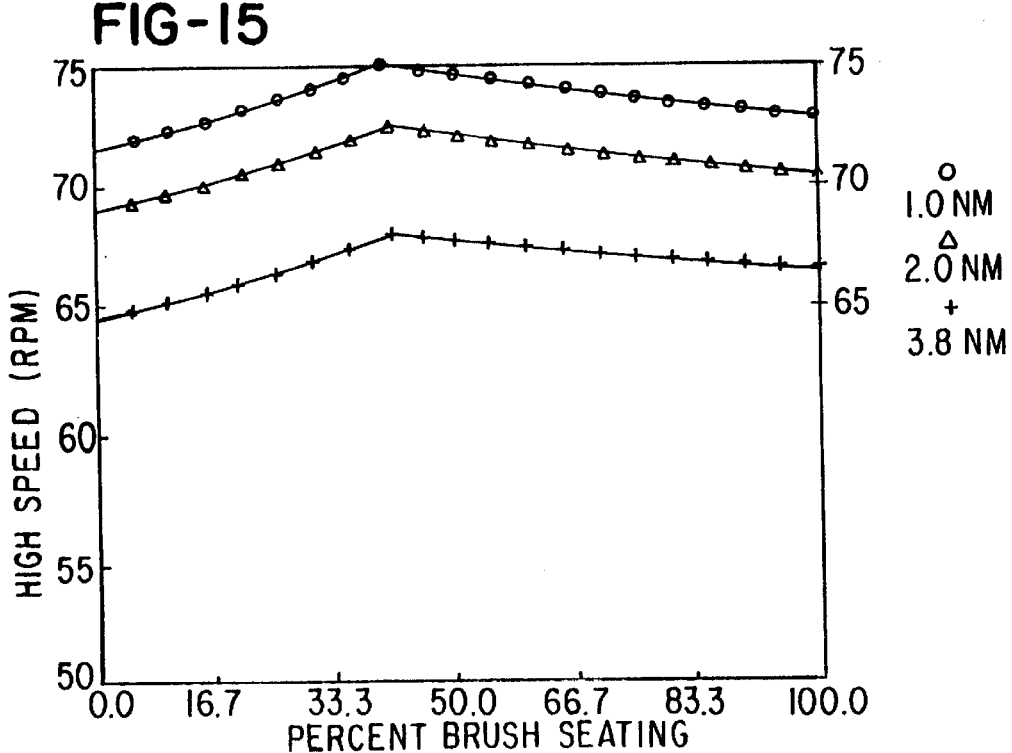
FIG-15
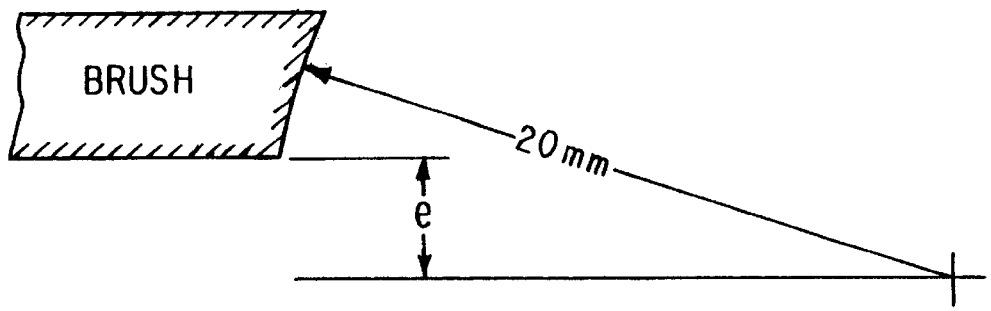
FIG-13

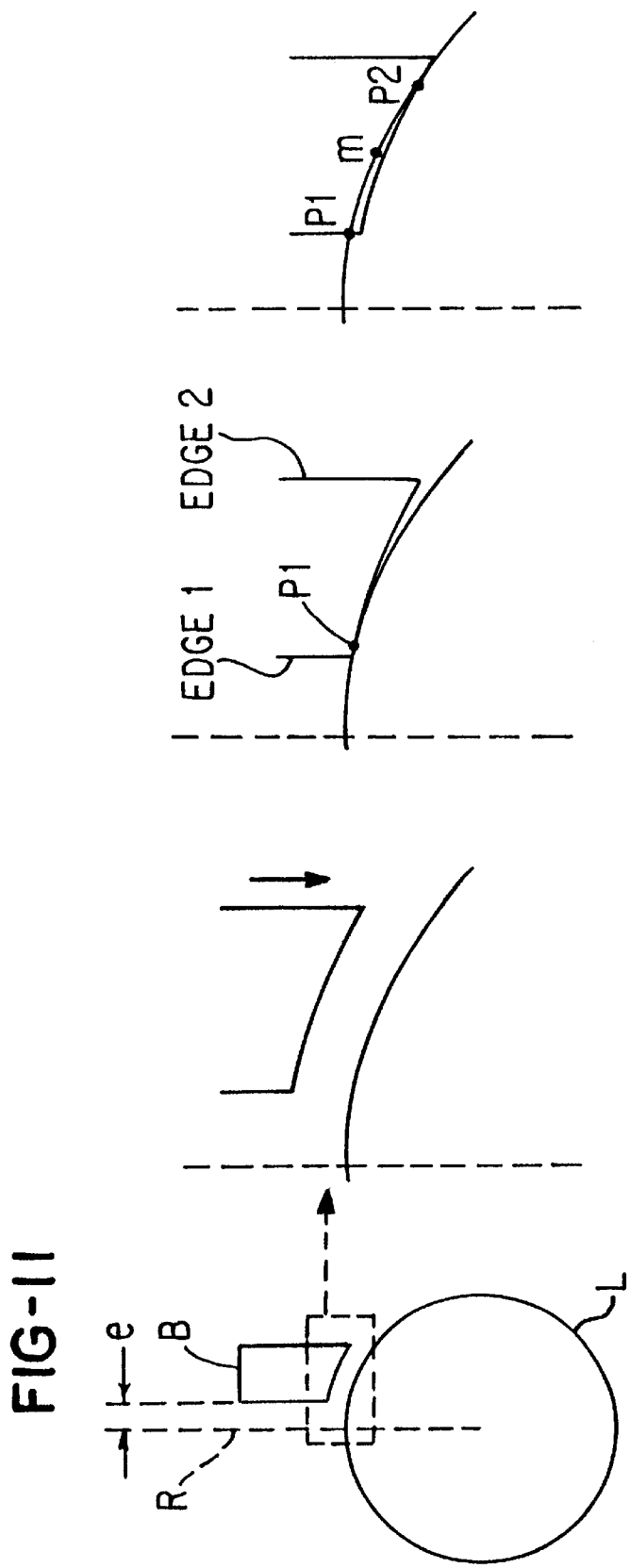

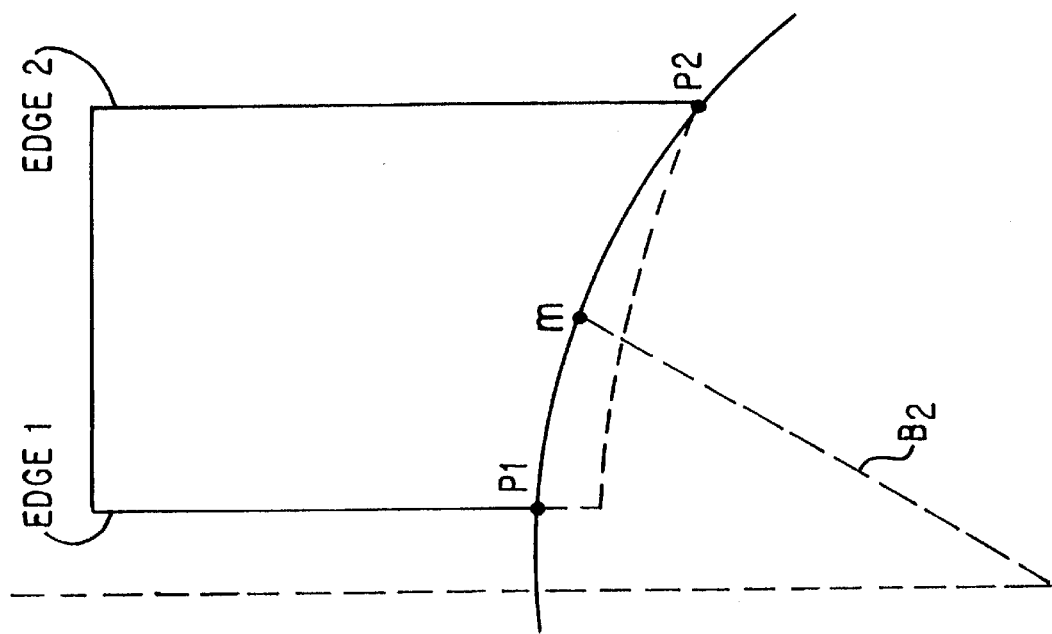
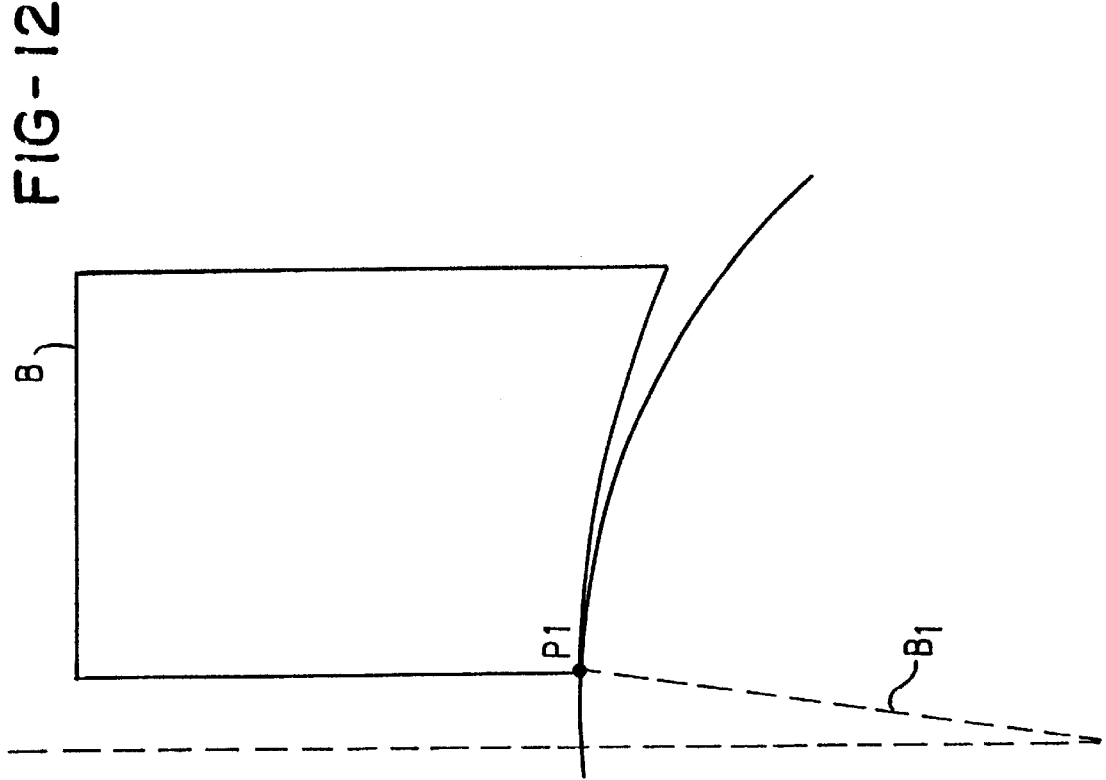
FIG-12

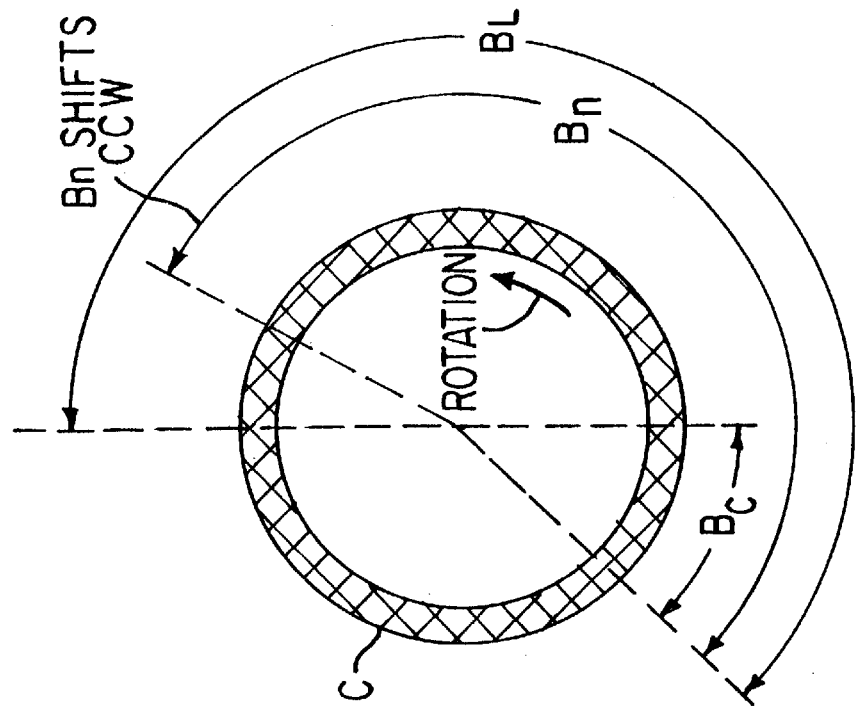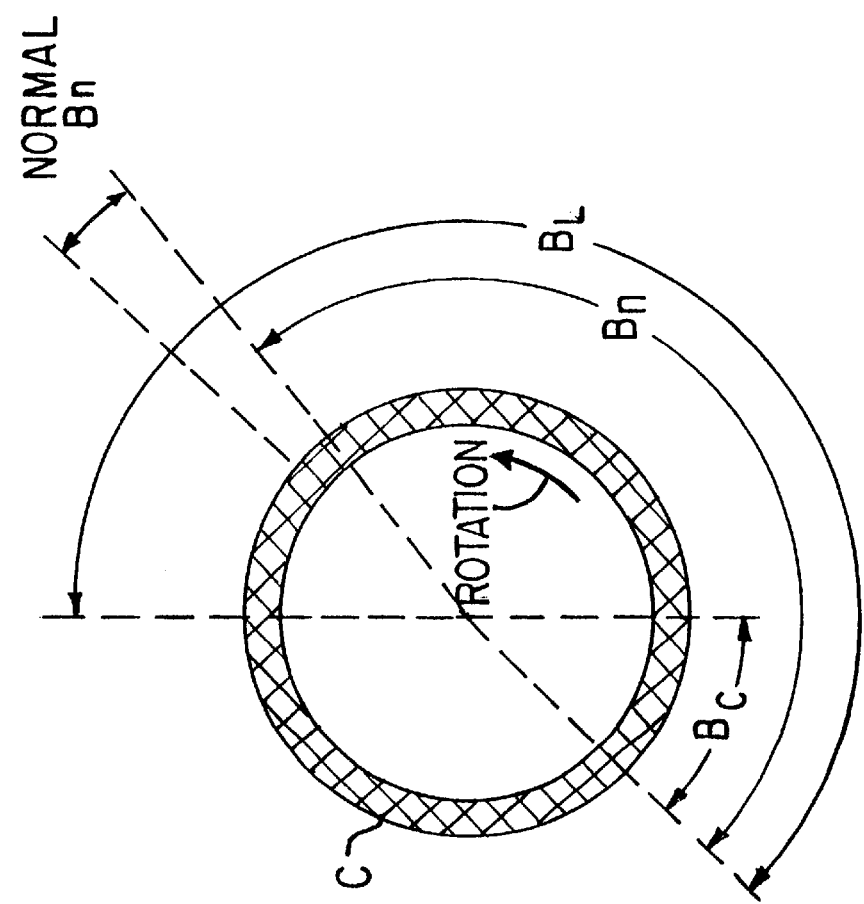

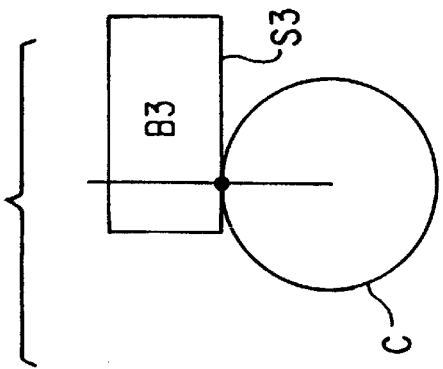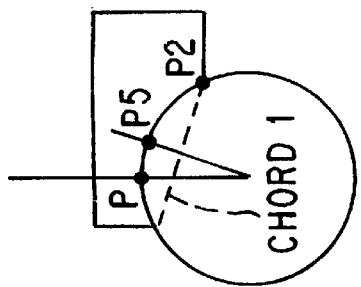
FIG-16C
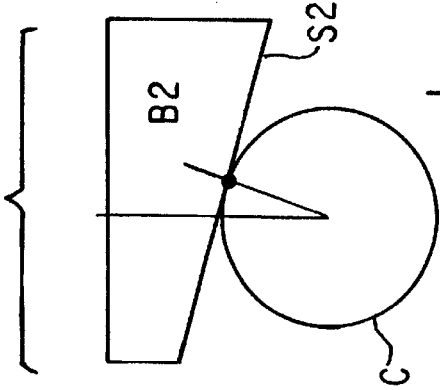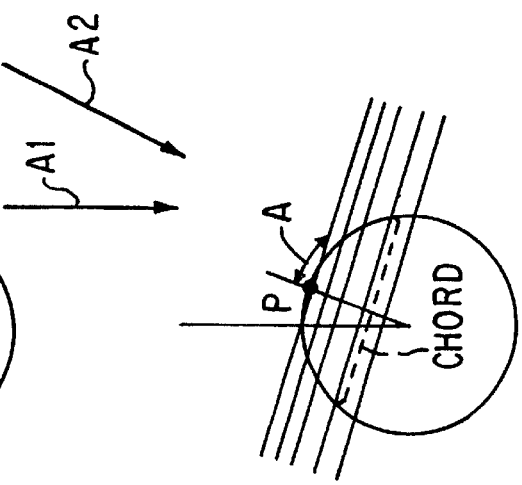
FIG-16B
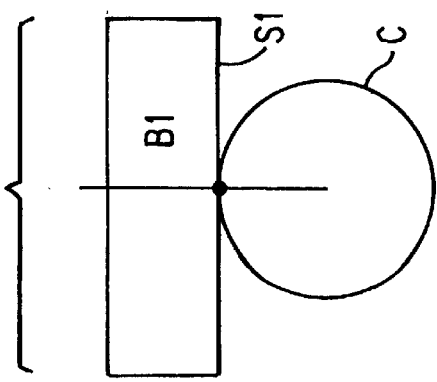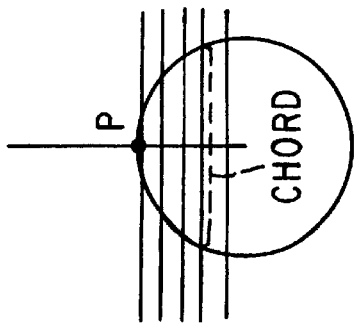
FIG-16A

REDUCED SPEED GROWTH IN WINDSHIELD WIPER MOTOR

RELATED APPLICATION

This is a continuation of application Ser. No. 08/475,771 filed Jun. 7, 1995, abandoned.

The invention relates to reducing the growth in speed of a DC motor, which ordinarily occurs as the brushes of the motor become seated.

BACKGROUND OF THE INVENTION

Motors used in windshield wipers in automotive vehicles are typically of the DC type, and are equipped with brushes, which deliver current to a rotating armature, via a commutator. In a newly manufactured motor, each brush makes contact with the commutator at a very small region. As the brushes become seated, however, the commutator wears cylindrical arcs into the brushes, and the region of contact grows. An increase in motor running speed accompanies this seating process.

This speed increase is not desirable.

OBJECTS OF THE INVENTION

An object of the invention is to provide an improved DC motor.

A further object of the invention is to provide a DC windshield wiper motor having a lessened increase in speed due to brush seating.

SUMMARY OF THE INVENTION

In one form of the invention, the contact face of a brush is designed such that, as seating occurs, the effective contact angle changes, and in a direction which opposes an increase in speed.

BRIEF DESCRIPTION OF THE DRAWINGS

FIGS. 1A–1C illustrate an equivalent circuit of a motor armature, and a simplification of the circuit.

FIGS. 5–7 illustrate the limits of integration used in certain equations given in the Specification.

FIG. 8 illustrates how motor speed changes during brush seating.

FIG. 9 resembles FIG. 8, but a narrower brush was used in the computation.

FIG. 10 shows selected data taken from FIGS. 8 and 9.

FIG. 11 illustrates one form of the invention.

FIG. 12 illustrates part of FIG. 11, in greater detail.

FIG. 13 provides dimensional information for the brush illustrated in FIG. 11.

FIGS. 14A and 14B illustrate principles used by the invention.

FIG. 15 is a plot of a computer simulation of the form of the invention shown in FIG. 11.

FIGS. 16A, 16B, 16C illustrate a comparison of some principles used by the invention with two superficially similar situations.

DETAILED DESCRIPTION OF THE INVENTION

Figure 1D:
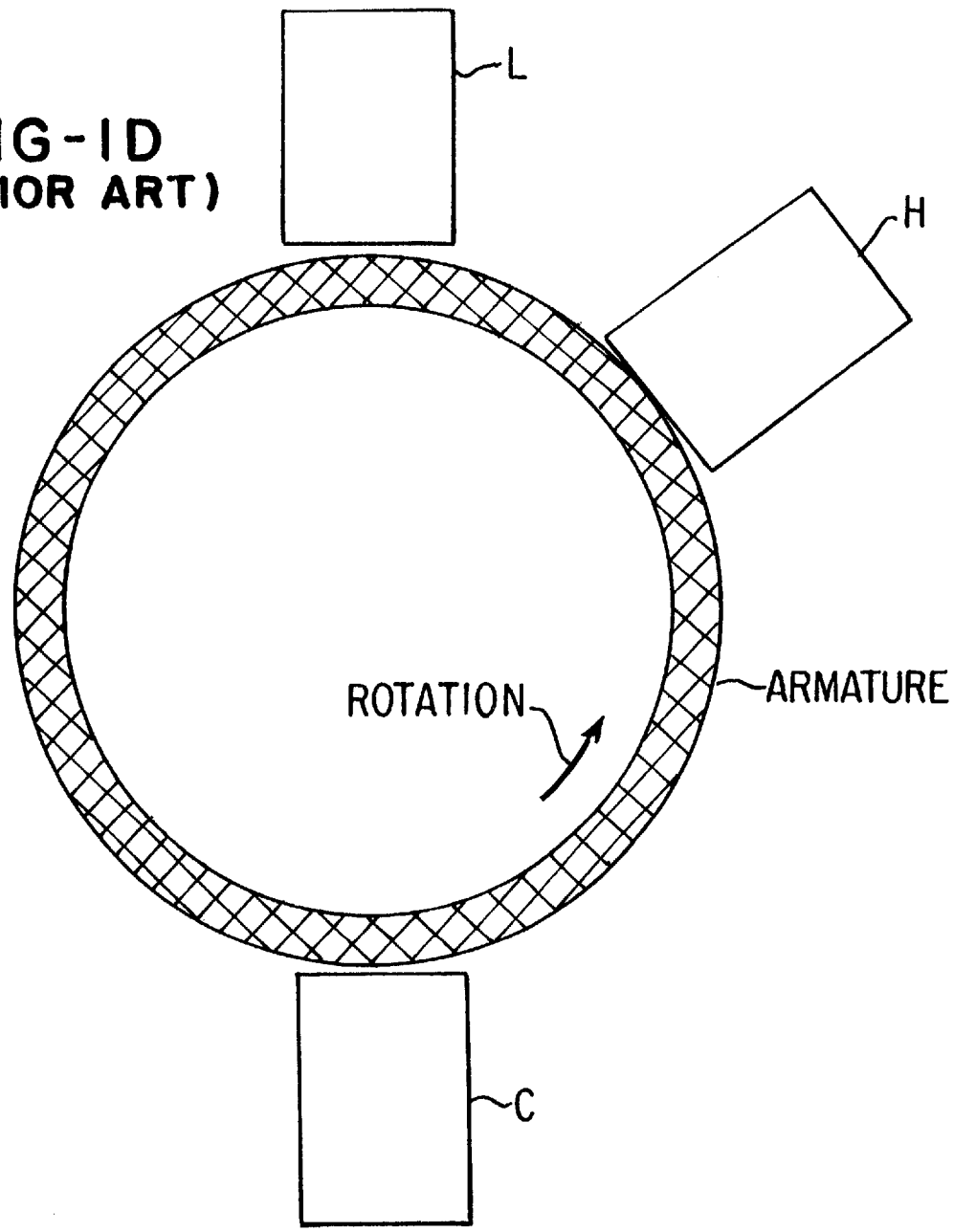
FIG. 1D illustrates a prior-art motor for a vehicular windshield wiper.

FIG. 1D is a schematic of a prior-art windshield wiper motor. During low speed operation, current is delivered to the ARMATURE by brushes L and C. During high speed operation, current is delivered to the ARMATURE by brushes H and C.

The advanced position of brush H (with respect to brush L, and against the direction of rotation), in general, causes the speed increase, when brush H is used, as compared with brush L.

Armature Model

The brush-armature system of FIG. 1D can be modelled as shown in FIG. 1A. Resistances R1 and R2 represent the resistances of the windings in the armature. Voltage sources $e_{g1}$ and $e_{g2}$ represent the voltages induced in the windings. Resistance $r_t$ represents the terminal contact resistance. Voltage source $V_b$ represents the voltage drop across the brush.

Simplification of Armature Model

Equivalent Resistance

This model can be simplified by use of the Thevenin equivalent shown in FIG. 1B. FIG. 1C shows why this simplification is justified. The top part of FIG. 1C illustrates how the equivalent resistance, $r_{eq}$, is obtained: the two voltage sources, $e_{g1}$ and $e_{g2}$ are both set to zero, resulting in the short circuits indicated. The equivalent resistance is the parallel sum of R1 plus R2, as indicated in equation 1, below.

$$r_{eq} = \frac{R_1 R_2}{R_1 + R_2} \quad (1)$$

Equivalent Voltage

The equivalent voltage $V_{eq}$ in FIG. 1B is obtained as shown in the bottom part of FIG. 1C. Using the principle of superposition, the voltage sources $e_{g1}$ and $e_{g2}$ are set to zero, one-at-a-time, and an output voltage ($V_{out1}$ and $V_{out2}$) is obtained for each case. These output voltages are each computed using the voltage-divider rule. The equivalent voltage, $V_{eq}$ in FIG. 1B, is the sum of these two voltages, and is given in Equation 2, below.

$$V_{eq} = \frac{e_{g1} R_2 + e_{g2} R_2}{R_1 + R_2} \quad (2)$$

Speed Equation

The simplified model of FIG. 1B can be used to obtain an expression for motor speed. Applying Kirchoff's Voltage Law (KVL) to FIG. 1B produces Equation 3, below.

$$V_{dc} = r_t I_a - V_b - r_{eq} I_a - V_{eq} \quad (3)$$

Equations 4–6 state well known motor relationships. In these equations,

"$k_V$" is an equivalent armature constant,

"$T_a$" is developed armature torque,

"n" is motor gear ratio,

"η" is gear box efficiency,

"$T_{out}$" is output torque, and

"$T_D$" is drag torque.

$$k_v = V_{eq}/\omega_r \quad (4)$$

$$T_{out} = n\eta T_a - T_D \quad (5)$$

$$T_a = k_v I_a \quad (6)$$

Equations 4–6 are substituted into Equation 3, which is then rearranged, to produce Equation 7.

$$\omega_r = \frac{V_{dc} - v_b}{k_v} - \frac{(T_{out} + T_d)(r_t + r_{eq})}{m\eta K_v^2} \quad (7)$$

Equation 7 gives angular rotational speed, $\omega_r$, as a function of several variables. These variables include $V_{eq}$ (given in Equation 2) and $r_{eq}$ (given in Equation 1). These variables are, in turn, computed from intermediate variables given in Equations 8–14. (Of these, Equation 11 defines a constant.) Table 1, below, indicates how the intermediate variables (of Equations 8–14) correspond to those needed in Equations 1 and 2, which are used to compute $V_{eq}$ and $r_{eq}$, and which are needed in Equation 7.

For example, the first line of Table 1 indicates that, under low speed operation, the variable $e_{g1}$ (shown in FIG. 1A and used in Equation 2) equals $e_{ga}$ which is computed in Equation 13. Under high speed operation, $e_{g1}$ equals the sum of $e_{ga}$ plus $e_{gb}$, computed in Equations 13 and 14.

Variables in Equations: Graphical Explanation

Figure 2:
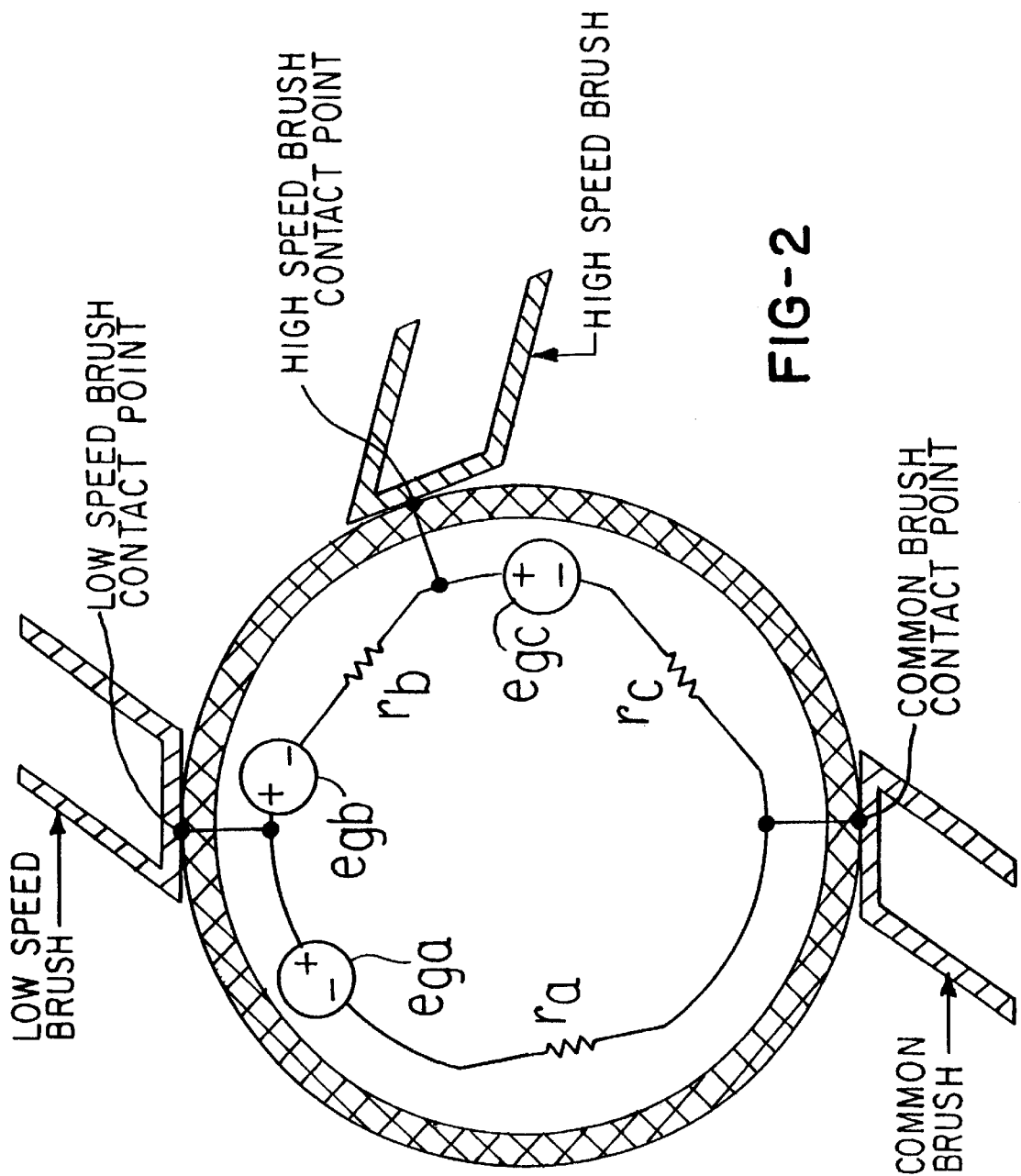
FIG. 2 illustrates an equivalent circuit for a DC motor.

The variables given in the two right-hand columns of Table 1 are defined in FIG. 2. The angles "β" in Equations 8–14 are defined in FIG. 3. In general, these angles are defined with respect to the contact points of the brushes, as indicated.

Figure 4:
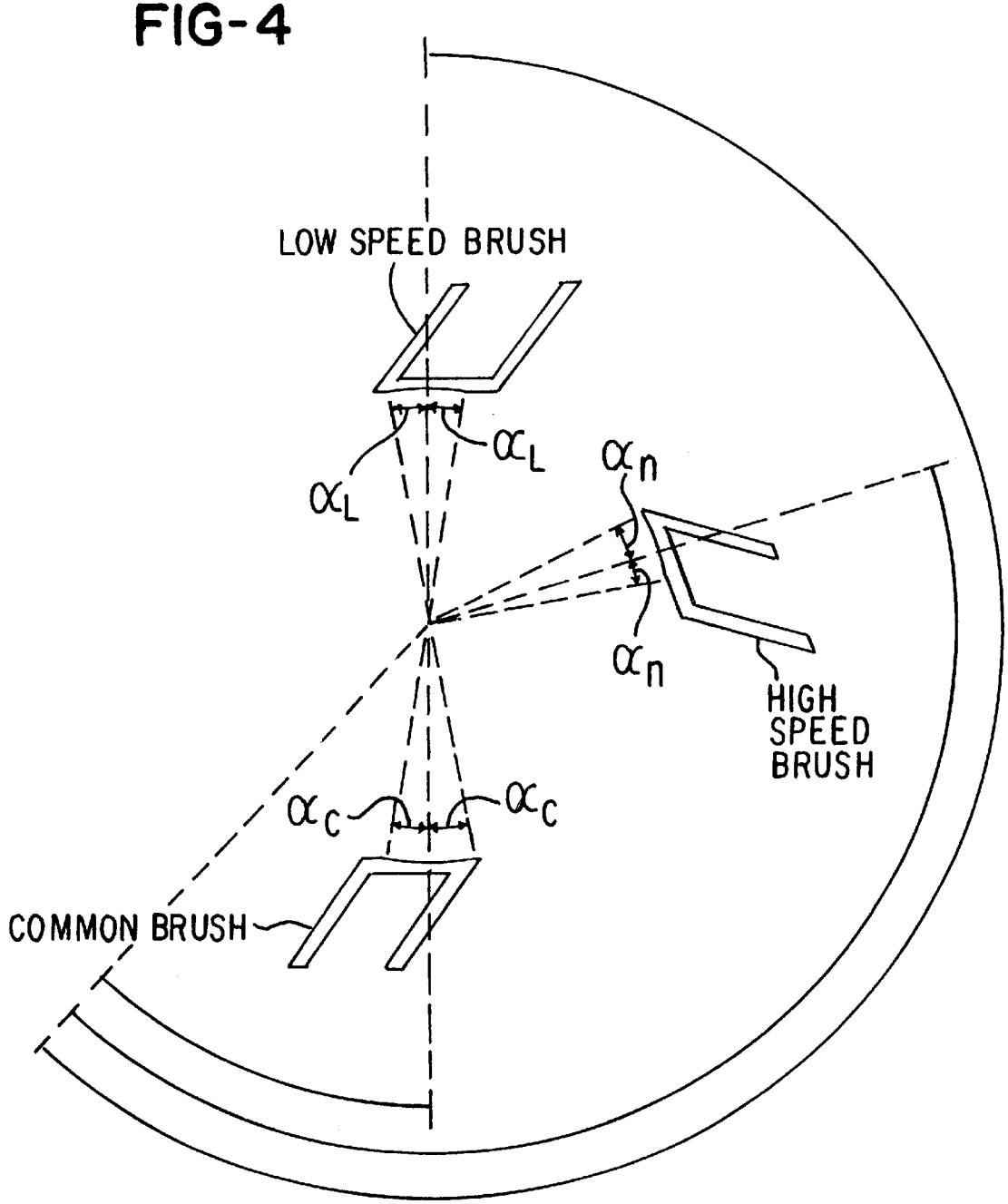

The angles "α" in Equations 8–14 are defined in FIG. 4. These angles indicate the lengths of the arcs which the commutator cuts into the brushes, as the brushes seat. Of course, in a new, unseated brush the angle "α" is zero (in theory).

Figure 5:
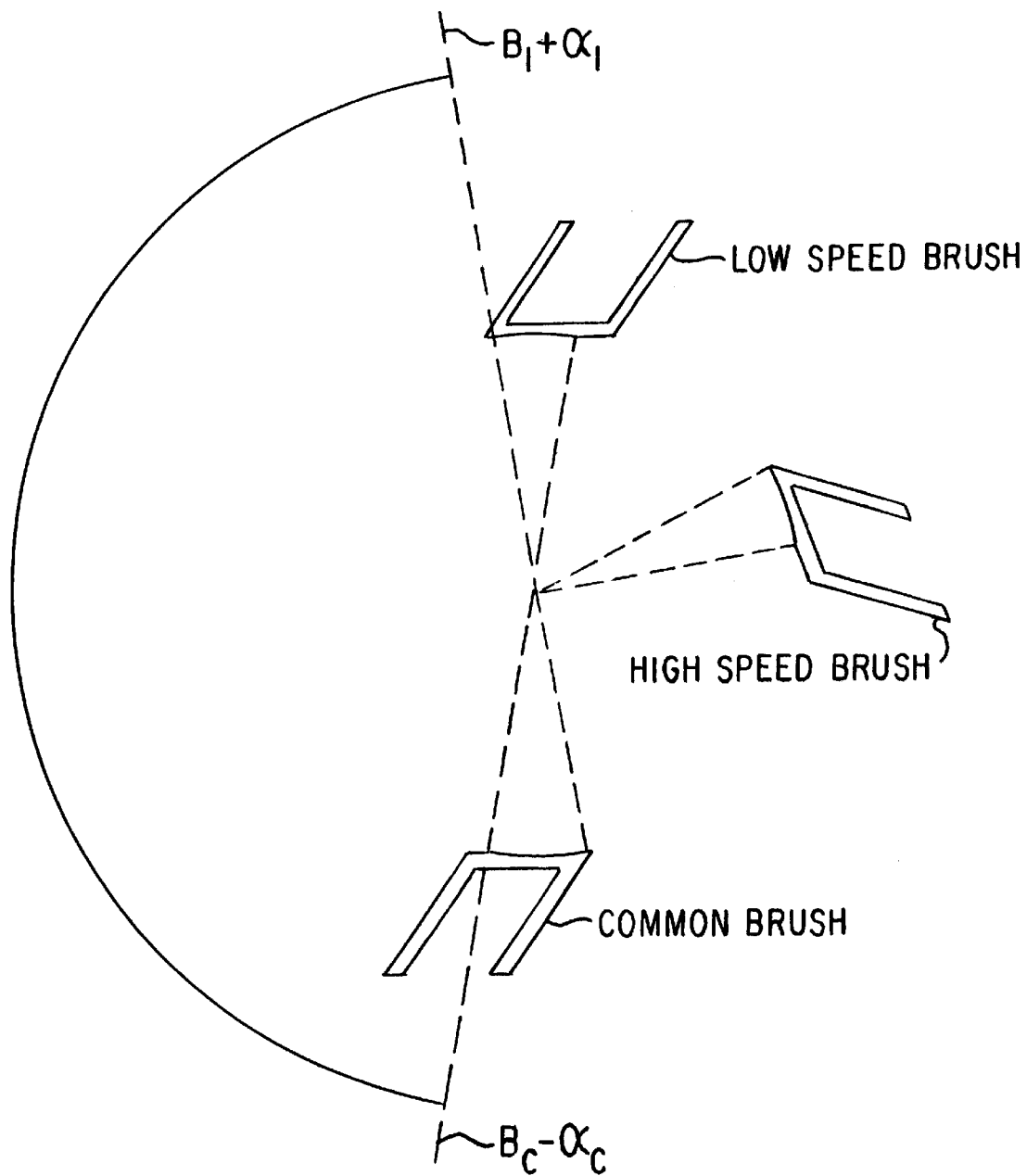
Figure 6:
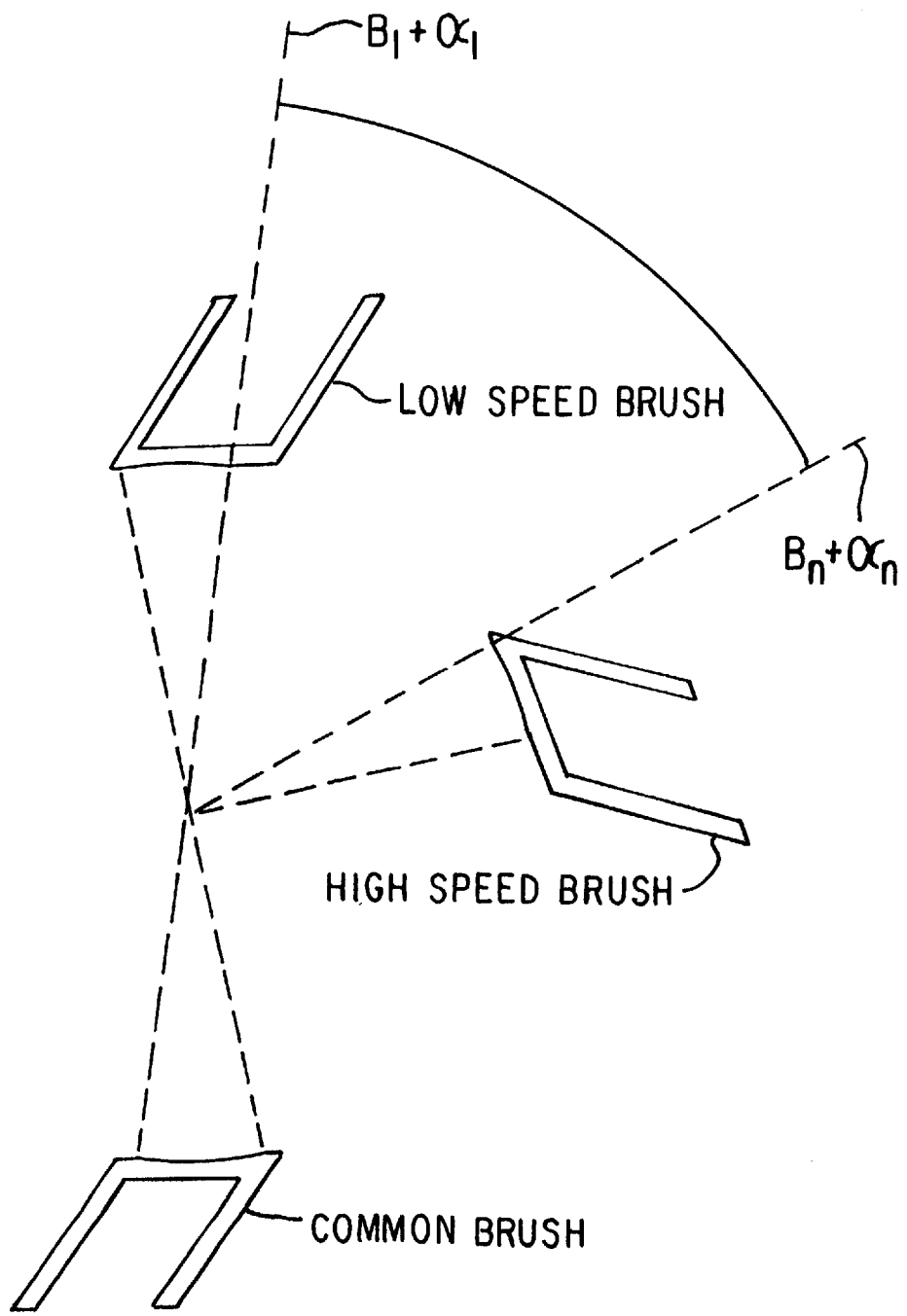

FIGS. 5–7 illustrate, in graphical form, the limits of integration stated in Equations 8–14. FIG. 5 refers to Equations 8 and 12. FIG. 6 refers to Equations 9 and 13. FIG. 7 refers to Equations 10 and 14. These Figures are obtained in a straightforward manner, by applying the limits of integration to FIGS. 3 and 4.

$$r_a = \int_{\beta_1 + \alpha_1}^{2\pi + \beta_c - \alpha_c} Zr_{coil}d\phi = Zr_{coil}[2\pi + \beta_c - \beta_1 - \alpha_c - \alpha_1] \quad (8)$$

$$r_b = \int_{\beta_h + \alpha_h}^{\beta_1 - \alpha_1} Zr_{coil}d\phi = Zr_{coil}[\beta_1 - \beta_h - \alpha_1 - \alpha_h] \quad (9)$$

$$r_c = \int_{\beta_c + \alpha_c}^{\beta_h - \alpha_h} Zr_{coil}d\phi = Zr_{coil}[\beta_h - \beta_c - \alpha_h - \alpha_c] \quad (10)$$

$$Z = \frac{CN_c}{2\pi} \quad (11)$$

$$e_{ga} = \int_{\beta_1 + \alpha_1}^{2\pi + \beta_c - \alpha_c} Z\Phi_m\omega_r\sin(\phi - \gamma)d\phi = Z\Phi_m\omega_r[\cos(\beta_c - \alpha_c - \gamma) - \cos(\beta_1 + \alpha_1 - \gamma)] \quad (12)$$

$$e_{gb} = \int_{\beta_h + \alpha_h}^{\beta_1 - \alpha_1} Z\Phi_m\omega_r\sin(\Phi - \gamma)d\Phi = -Z\Phi_m\omega_r[\cos(\beta_1 - \alpha_1 - \gamma) - \cos(\beta_h + \alpha_h - \gamma)] \quad (13)$$

$$e_{gc} = \int_{\beta_c + \alpha_c}^{\beta_h - \alpha_h} Z\Phi_m\omega_r\sin(\Phi - \gamma)d\Phi = -Z\Phi_m\omega_r[\cos(\beta_1 - \alpha_1 - \gamma) - \cos(\beta_c + \alpha_c - \gamma)] \quad (14)$$

TABLE 1

| Characteristic (FIG. 2) | Low Speed Operation | High Speed Operation |
|---|---|---|
| $e_{g1}$ | $e_{ga}$ | $e_{ga} + e_{gb}$ |
| $e_{g2}$ | $e_{ga}$ | $e_{gc}$ |
| R1 | $r_a$ | $r_a + r_b$ |
| R2 | $r_a$ | $r_c$ |

Equations 8–14 are simplifications, and assume that both the resistance of the armature coils, and the induced voltages, can be treated as though continuously distributed over the circumference of the armature.

Plot of Equation 7

The inventors ran a computer simulation, based on Equation 7, using brushes having widths of 4.5 mm. (Width is defined as dimension W in FIG. 3.) The computation was done for three load points, namely, 1.0, 2.0, and 3.8 Newton-meters of torque. FIG. 8 illustrates the results. One can see that speed monotonically increases as the brushes become seated.

The inventors repeated the simulation, but with a different brush width, namely, 4.0 mm. FIG. 9 illustrates the results.

FIG. 10 emphasizes selected data from FIGS. 8 and 9. FIG. 10 indicates that, upon full seating, for each load, the final speed of the narrow (4.0 mm) brush, is less than final speed of the wide brush. The differences range from 0.7 to 0.9 rpm.

Analysis

The independent variable $\omega_r$ in Equation 7 depends upon its dependent variables in a complicated manner. However, the Inventors surmised that one significant factor causing the speed increase was the increase in the angles α (see FIG. 4), which occurs as the brushes seat. In order to compensate for this change in α, the Inventors proposed causing the angles β (see FIG. 3) to shift as the seating occurs.

One approach to causing this shift is illustrated in FIG. 11. A brush B is offset from a radius R by dimension e. As the brush moves into contact with the commutator C, it initially contacts at point P1. As the brush seats, an arc becomes worn into the brush. The arc terminates at points P1 and P2, as indicated.

However, the initial point P1 is located nearer to the EDGE1 than to EDGE 2. Consequently, the wear-in causes the arc to reach EDGE 1 before reaching EDGE 2. Once the arc reaches EDGE1, the angular position of P1 does not change. However, P2 does continue to move as wear-in progresses.

Because P2 is moving, while P1 is fixed, the midpoint M of the arc moves, changing the brush angle, β. FIG. 12 illustrates this change in greater detail.

Initially, the brush B contacts at a single point P1. The At brush contact angle, β1, is indicated. As seating occurs, an arc is cut into the brush, which terminates at points P1 and P2. As the arc is being cut, P1 moves left, and P2 moves right. However, when P1 reaches EDGE 1, P1 stops moving. Now, as the arc continues to be cut, the midpoint M, which defines the angle β, moves to the right, because P2 is moving rightward. The angle β2 is different from β1.

FIG. 13 provides dimensional information for the brush illustrated in FIG. 11.

FIG. 14 gives an implementation of some of the principles discussed above. In FIG. 14A, brush placement is done as in the prior art, with the exception that initial $\beta_h$ is advanced against the direction of rotation, by about ten degrees.

This advancement causes, as expected, a small increase in initial speed. In particular, this advancement, using narrow (4.0 mm) brushes, was found to give an initial speed which was about equal to the final, fully seated, speed attained using wide (4.5 mm) brushes.

Upon final seating, the invention causes $\beta_h$ to become retarded (in the direction of rotation, or counter-clockwise, CCW).

Plot of Invention

FIG. 15 illustrates a plot of a computer simulation of the invention shown in FIG. 11. Clearly, the speeds peak at about 40% of seating. Further, the pairs of (initial speed, final speed) are approximately given by (64.5, 66) at 3.0 Nt–m (69.0, 70.5) at 2.0 Nt–m (72.0, 73.0) at 1.0 Nt–m.

Further still, the peak speeds are about 67, 72, and 75, running from heaviest to lightest loading.

Percentage Computations

Given these data, the maximum percentage peak in speed is about four percent:

(75−72)/72=0.042.

The maximum final percentage rise in speed is about 2.3 percent:

(66−64.5)/64.5=0.023

Distinction

The change in β caused by the brush geometry shown in FIG. 12 should be distinguished from the superficially similar situations shown in FIGS. 16A and 16B. In these Figures, two brushes B1 and B2 are shown. The contact surfaces S1 and S2 are both flat.

In both brushes, at the initial instant of contact, each flat surface S1 and S2 contact the commutator C at a single point P, and are tangent at that point. (Reason: by definition, any straight line which contacts a circle at a single point is tangent at that point.)

Then, so long as the brushes move in a straight line (indicated by either arrow A1 or A2), the contact surfaces S1 and S2 will remain parallel to the initial tangent line. (Reason: if the brushes move in a straight line, angle A in FIG. 16B remains constant. The surfaces S1 and S2 remain parallel to their former positions.)

Since the surfaces S1 and S2 remain parallel to a the initial tangent, as they move, the CHORD defined by S1 and S2 will always remain bisected by the radius which runs through the initial contact point P.

Therefore, the angle β (defined in FIG. 3) remains constant. β is defined by the centroid of the arc cut into a brush. This centroid remains at P.

However, in contrast, if the arc being cut reaches an edge of the brush, as in FIG. 16C (and FIG. 12), then the left end of CHORD1 in FIG. 16C terminates at that EDGE, but the right end continues to follow P2 as the arc is cut. The centroid of the arc, indicated by point P5, moves clockwise, away from initial point P. β changes.

Use of appropriate curved surfaces, in different positions, instead of flat surfaces S1 and S2, can control how the centroid P5 moves over time.

Definitions

Figure 3:
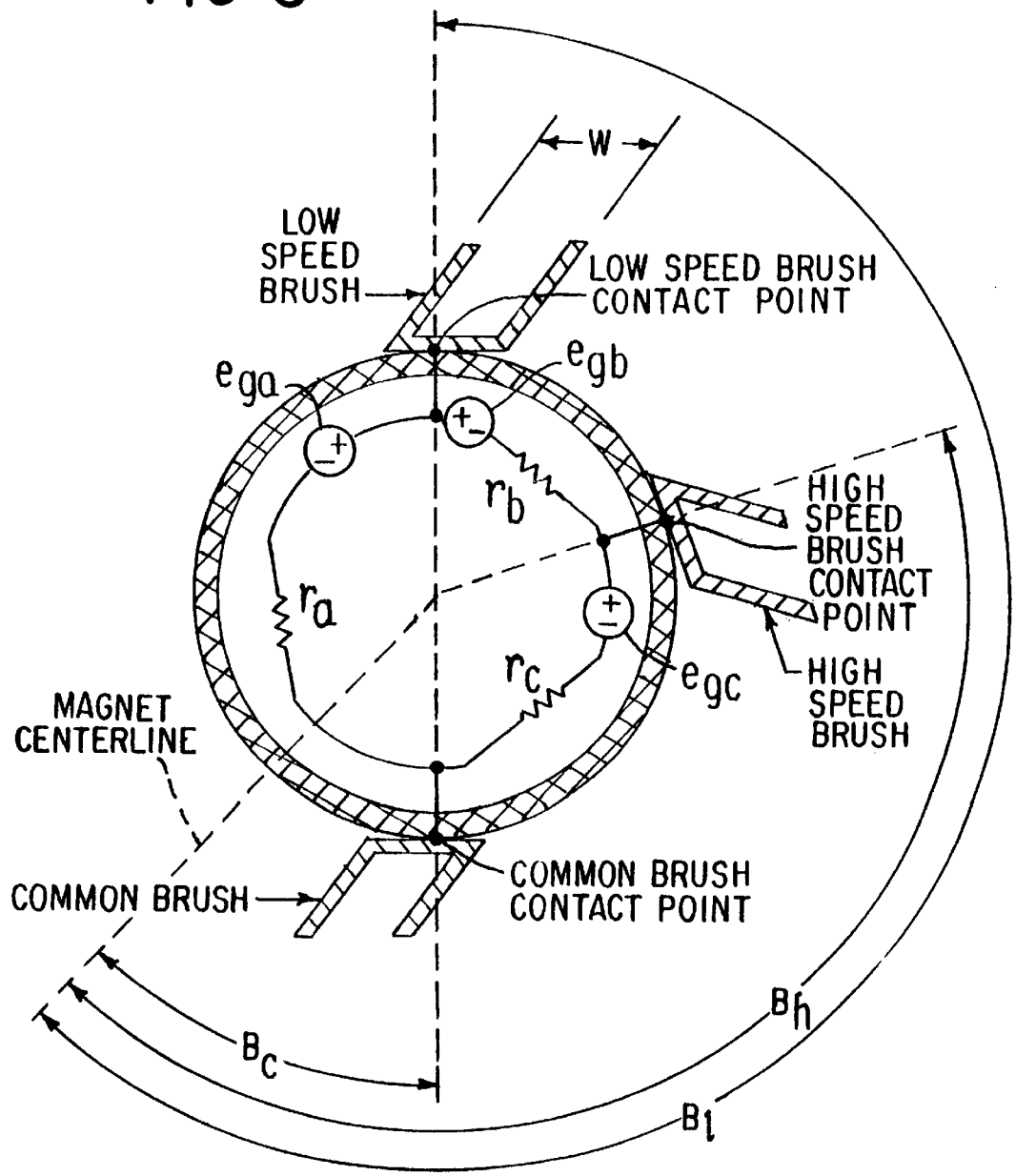
FIGS. 3 and 4 define angles used in certain equations given in the Specification.

The angles β in FIG. 3 can be called "effective brush angles," or "effective brush contact angles." Initially, for a new brush, the angle is determined by a single point of contact. For a seated, or partially seated, brush, the angle is determined by the midpoint, or centroid, of the arc cut into the brush.

The term "brush" is a term-of-art. Present-day brushes take the form of abrasion-resistant blocks of carbon or graphite, which may be sintered with a binder. The term "brush" is believed to be applied to such structures for historical reasons.

Additional Embodiment

The preceding discussion has implied that the invention is applied to the high-speed brush alone. However, in some situations, this restricted can be lifted, and the invention can be applied to two, or all, of the brushes shown in FIG. 2.

Numerous substitutions and modifications can be undertaken without departing from the true spirit and scope of the invention. What is desired to be secured by Letters Patent is the invention as defined in the following claims.

I claim:

1. An electric motor in which brush seating occurs, comprising:
   a) brush means which
      i) causes motor speed to increase during early stages of brush seating; and
      ii) causes motor speed to decrease during later stages of brush seating.

2. Motor according to claim 1, in which the early stages of brush seating terminate at about 40 percent of total brush seating.

3. Motor according to claim 1, in which the later stages of brush seating begin at about 40 percent of total brush seating.

4. Motor according to claim 1, in which motor speed at full brush seating is greater than motor speed at an initial brush seating.

5. Motor according to claim 4, in which the motor speed at full brush seating is no more than about 102.3 percent of the motor speed at initial brush seating.

6. Motor according to claim 1, in which motor speed peaks at some amount of seating, and the speed at the peak is no greater than 104.2 percent of the motor speed at initial brush seating.

7. An electric motor, comprising:
 a) a commutator;
 b) brush means, which
   i) contacts the commutator, and
   ii) experiences brush seating as the motor operates, which causes
     A) motor speed to increase during initial stages of brush seating;
     B) motor speed to peak at about 40 percent of brush seating, at a peak speed of about 104.2 percent, or less, of motor speed at an initial brush seating, and
     C) motor speed to decrease after peaking, to a motor speed at full brush seating of about 102.3 percent, or less, of motor speed at initial brush seating.

8. An electric motor, comprising:
 a) a commutator;
 b) a brush
   i) which contacts the commutator at a contact surface,
     A) of length 2×ALPHA, and
     B) which is centered at a point which defines an effective brush angle, BETA; wherein ALPHA is one-half the length of said contact surface and BETA defines said effective brush angles;
   ii) which wears during operation of the motor, causing ALPHA to increase, thereby tending to cause motor speed to change; and
   iii) in which the wear causes BETA to change in a manner which compensates for the change in ALPHA, thereby opposing the change in motor speed.

* * * * *